United States Patent
Yu et al.

(10) Patent No.: US 8,523,361 B2
(45) Date of Patent: Sep. 3, 2013

(54) PROJECTION DEVICE WITH BRIGHTNESS ADJUSTMENT FUNCTION AND METHOD THEREOF

(75) Inventors: Ying-Chuan Yu, Taipei Hsien (TW); Ying-Xiong Huang, Taipei Hsien (TW); Hsing-Chu Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 255 days.

(21) Appl. No.: 12/981,563

(22) Filed: Dec. 30, 2010

(65) Prior Publication Data

US 2012/0105809 A1     May 3, 2012

(30) Foreign Application Priority Data

Oct. 27, 2010   (TW) ................................ 99136649 A

(51) Int. Cl.
*G03B 21/14*     (2006.01)
*G03B 21/28*     (2006.01)
*G02B 5/30*      (2006.01)
*G02B 27/14*     (2006.01)
*G02B 27/12*     (2006.01)
*G02F 1/1335*    (2006.01)

(52) U.S. Cl.
USPC ............ 353/20; 353/33; 353/81; 359/485.06; 359/638; 359/640; 349/57

(58) Field of Classification Search
USPC ................. 353/20, 33, 81; 359/485.06, 638, 359/640; 349/57
See application file for complete search history.

(56) References Cited

U.S. PATENT DOCUMENTS

2008/0297739 A1* 12/2008 Yamauchi et al. .............. 353/85
2012/0120329 A1*  5/2012 Chuang et al. ..................... 349/5

FOREIGN PATENT DOCUMENTS

| CN | 1790097 A | 6/2006 |
|---|---|---|
| CN | 1847971 A | 10/2006 |
| CN | 1916691 A | 2/2007 |
| JP | 2007-79402 | 3/2007 |
| TW | I279638 | 4/2007 |
| TW | I289691 | 11/2007 |
| TW | 200909973 | 3/2009 |

* cited by examiner

*Primary Examiner* — Georgia Y Epps
*Assistant Examiner* — Magda Cruz
(74) *Attorney, Agent, or Firm* — Altis Law Group, Inc.

(57) ABSTRACT

A projection device with an illumination adjustment function includes a polarization beam splitter (PBS), a display, a light source, a lens module, a power supply unit, a light detection unit and a power controller. The light source emits light to the PBS. The lens module projects the images to be displayed by the display. The power supply unit supplies power for the light source. The light detection unit acquires a digital value of a portion of the light transmitted from the PBS, and compares the digital value with a predetermined digital value to generate a control signal. The power controller adjusts power from the power supply unit to the light source according the control signal until the digital value matches the predetermined digital value of the light from the light source.

7 Claims, 4 Drawing Sheets

PROJECTION DEVICE WITH BRIGHTNESS ADJUSTMENT FUNCTION AND METHOD THEREOF

RELATED APPLICATIONS

The subject matter disclosed in this application is related to subject matters disclosed in copending applications entitled, "PROJECTION DEVICE WITH BRIGHTNESS ADJUSTMENT FUNCTION AND METHOD THEREOF", filed Dec. 28, 2010 Ser. No. 12/980,311; "PROJECTION DEVICE WITH BRIGHTNESS ADJUSTMENT FUNCTION AND METHOD THEREOF", filed Dec. 30, 2010 Ser. No. 12/981,562); "PROJECTION DEVICE WITH BRIGHTNESS ADJUSTMENT FUNCTION AND METHOD THEREOF", filed Dec. 30, 2010 Ser. No. 12/981,565, and assigned to the same assignee as named herein.

BACKGROUND

1. Technical Field

The present disclosure relates to projection devices and, particularly, to a projection device having a brightness adjustment function and a method for the same.

2. Description of Related Art

In general, projection devices such as projectors are usually connected to an image output device, such as a video tape recorder or a VCD player. When the projection device projects images onto a projection surface in a room that is not dark enough, the images may look washed out.

DETAILED DESCRIPTION

Figure 1:
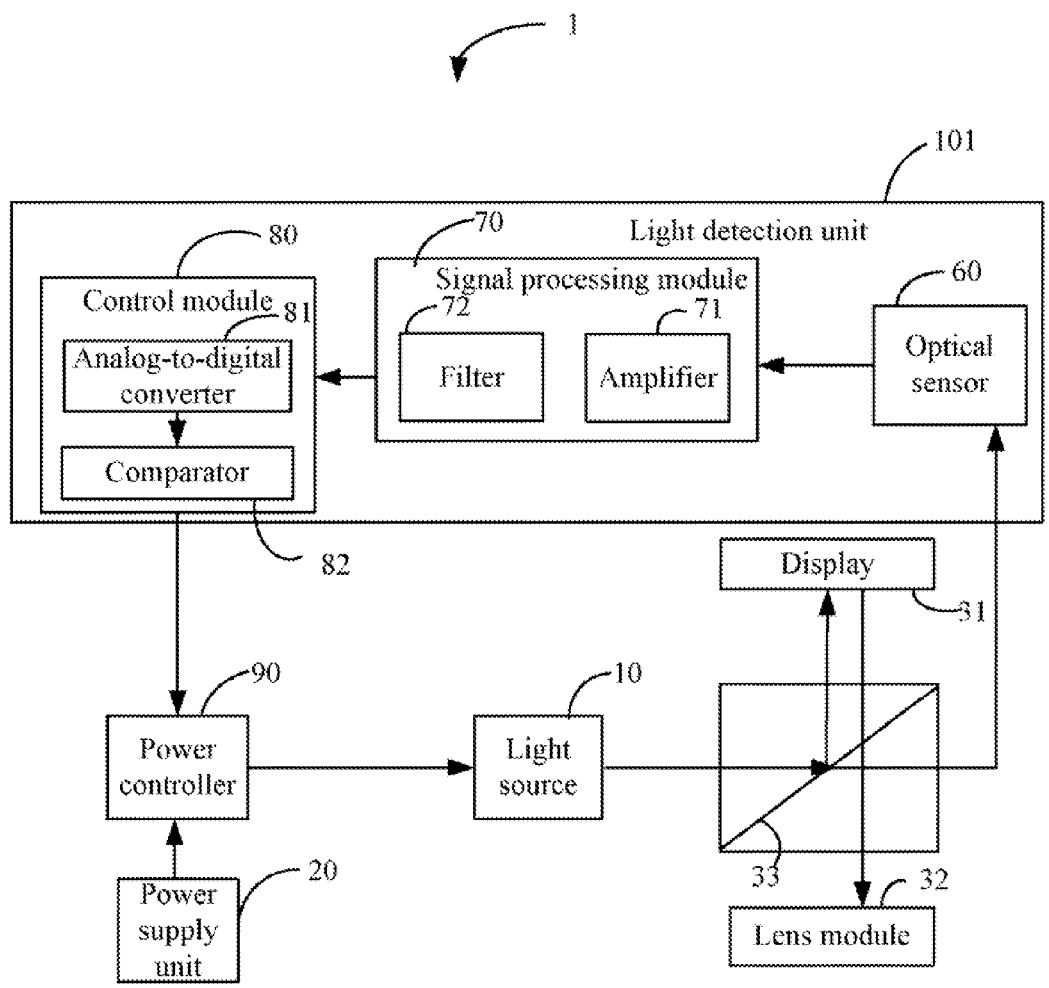
FIG. 1 is a block diagram of a hardware infrastructure of a projection device with a brightness adjustment function in accordance with an exemplary embodiment.

Referring to FIG. 1, a projection device 1 includes a light source 10, a power supply unit 20, a power controller 90, a display 31, a light detection unit 101, a lens module 32 and a polarization beam splitter (PBS) 33.

The light source 10 emits light to the PBS 33. In one embodiment, the light source 10 may be an LED.

The power supply unit 20 supplies power to the light source 10 through the power controller 90, thereby controlling a digital value of the light from the light source 10.

The PBS 33 reflects a portion of the light from the light source 10 to the display 31, and transmits a remaining portion of the light from the light source 10. The display 31 display images, receives the light from the PBS, and reflects the received light to the lens module 32. The lens module 32 projects the images displayed onto a projection surface. In one embodiment, the display 31 is a liquid crystal on silicon (LCOS).

The light detection unit 101 acquires a digital value of the light which is transmitted from the PBS 33, and compares the digital value with a predetermined digital value to generate a control signal. In one embodiment, the light detection unit 101 includes an optical sensor 60, a signal processing module 70, and a control module 80. The optical sensor 60 senses the light, which is transmitted from the PBS 33 to generate a sensing signal. In one embodiment, the optical sensor 60 is a micro-electro mechanical system (MEMS) sensor.

The signal processing module 70 includes an amplifier 71 and a filter 72. The amplifier 71 amplifies the sensing signal from the optical sensor 60. The filter 72 filters the amplified sensing signal to generate an analog signal.

The control module 80 includes an analog-to-digital converter 81 and a comparator 82. The analog-to-digital converter 81 converts the analog signal to a digital signal. The comparator 82 compares the converted digital signal with a predetermined digital signal to generate the control signal.

The power controller 90 adjusts power from the power supply unit 20 to the light source 10 according to the control signal until the digital value matches the predetermined digital value of the light from the light source 10.

Figure 2:
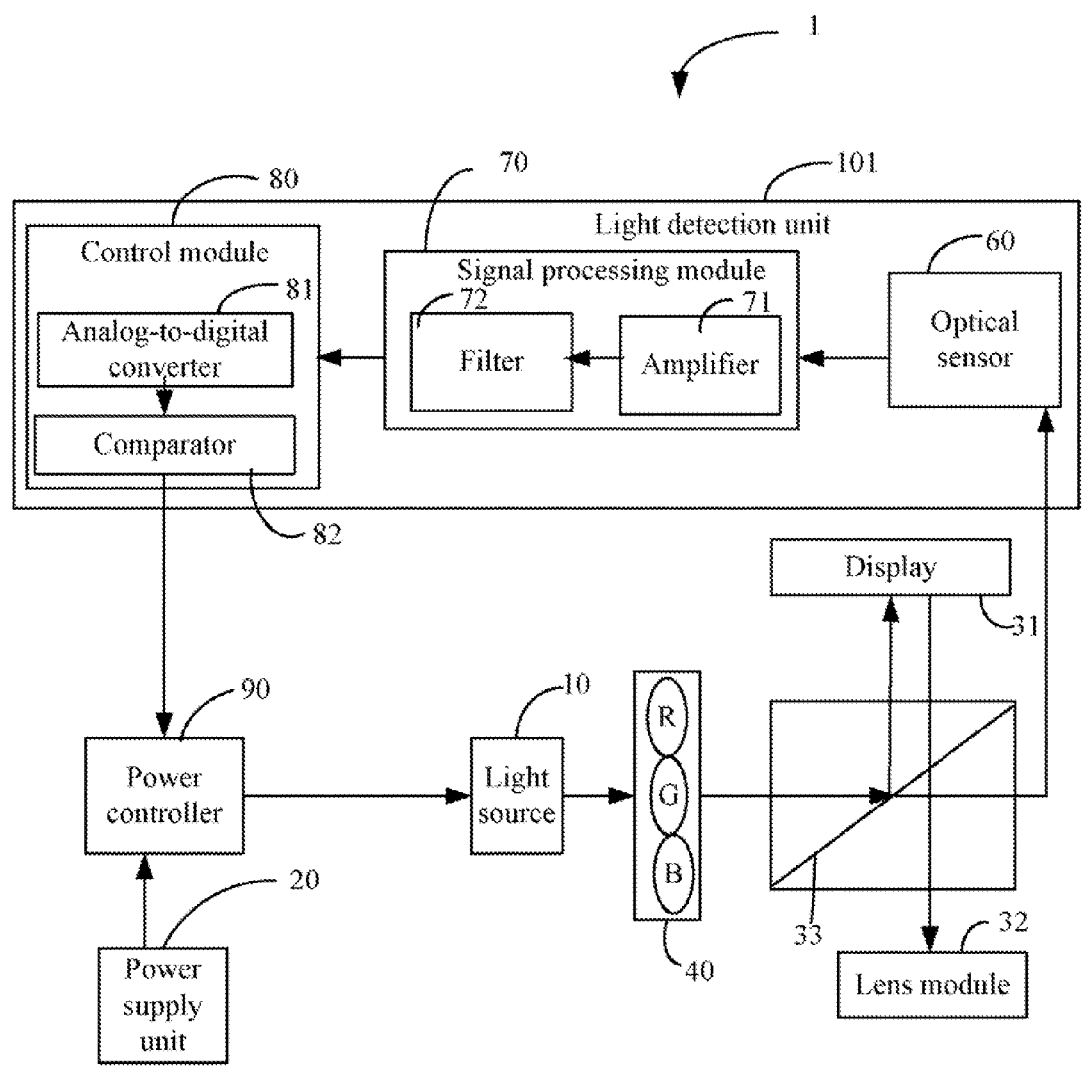
FIG. 2 is a block diagram of a hardware infrastructure of a projection device with a brightness adjustment function in accordance with a second embodiment.

As shown in FIG. 2, in the second embodiment of the disclosure, the projection device 1 further includes a color wheel 40 rotatably placed between the light source 10 and the PBS 33. The color wheel 40 includes a number of filters which projects the multicolor lights to the PBS 33 when the light from the light source 10 passes through the color wheel 40. In one embodiment, the color wheel 40 includes a red filter, a green filter and a blue filter. When the light from the light source 10 passes through the color wheel 40, the color wheel 40 will project the red light, the green light, and the blue light to the PBS 33.

Figure 3:
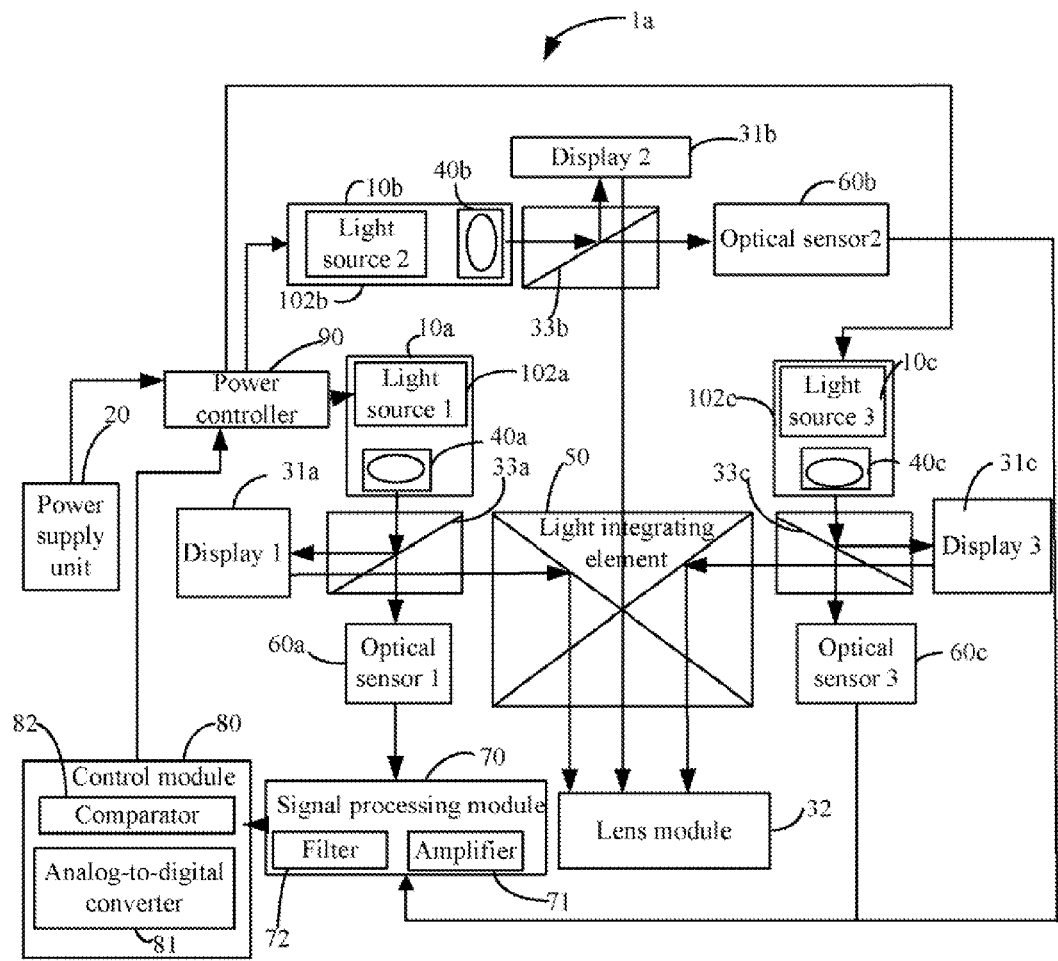
FIG. 3 is a block diagram of a hardware infrastructure of a projection device with a brightness adjustment function in accordance with a third embodiment.

As shown in FIG. 3, in the third embodiment of the disclosure, the projection device 1a further includes three light source mechanisms 102a, 102b, and 102c, three displays 31a, 31b and 31c, and a light integrating element 50. In one embodiment, the light source mechanism 102a includes a light source 10a and a color wheel 40a, the light source mechanism 102b includes a light source 10b and a color wheel 40b, and the light source mechanism 102c includes a light source 10c and a color wheel 40c. The color wheel 40a includes a red filter, the color wheel 40b includes a green filter, and the color wheel 40c includes a blue filter. In other embodiments, the light source mechanism 102a may be a red light source, the light source mechanism 102b may be a green light source, and the light source mechanism 102c may be a blue light source.

The three light sources 10a, 10b, and 10c respectively emit the light to the color wheel 40a, 40b, and 40c. The color wheel 40a, 40b, and 40c respectively projects the red light, the green light and the blue light to the PBS 33a, 33b, and 33c. The PBS 33a, 33b, and 33c respectively reflect the portion of the red light, the green light, and the blue light to the display 31a, 31b, and 31c, and transmit the remaining portion of the red light, the green light and the blue light. The light integrating element 50 is for integrating the images from the displays 31a, 31b, and 31c to the lens module 32.

The light detection unit 101 includes three optical sensors 60a, 60b, and 60c which respectively sense the light transmitted from the PBS 33a, 33b, and 33c to generate three sensing signals.

The signal processing module 70 amplifies and filters the three sensing signals to generate three corresponding analog signals. The control module 80 converts the three analog signals to three digital signals, and respectively compares the three digital signals with the predetermined digital signal to generate three control signals. The power controller 90 adjusts power from the power supply unit 20 to the three light sources 10a, 10b, and 10c according to the three control signals until the three digital values respectively match the predetermined digital value of the light from the three light sources 10a, 10b, and 10c.

Figure 4:
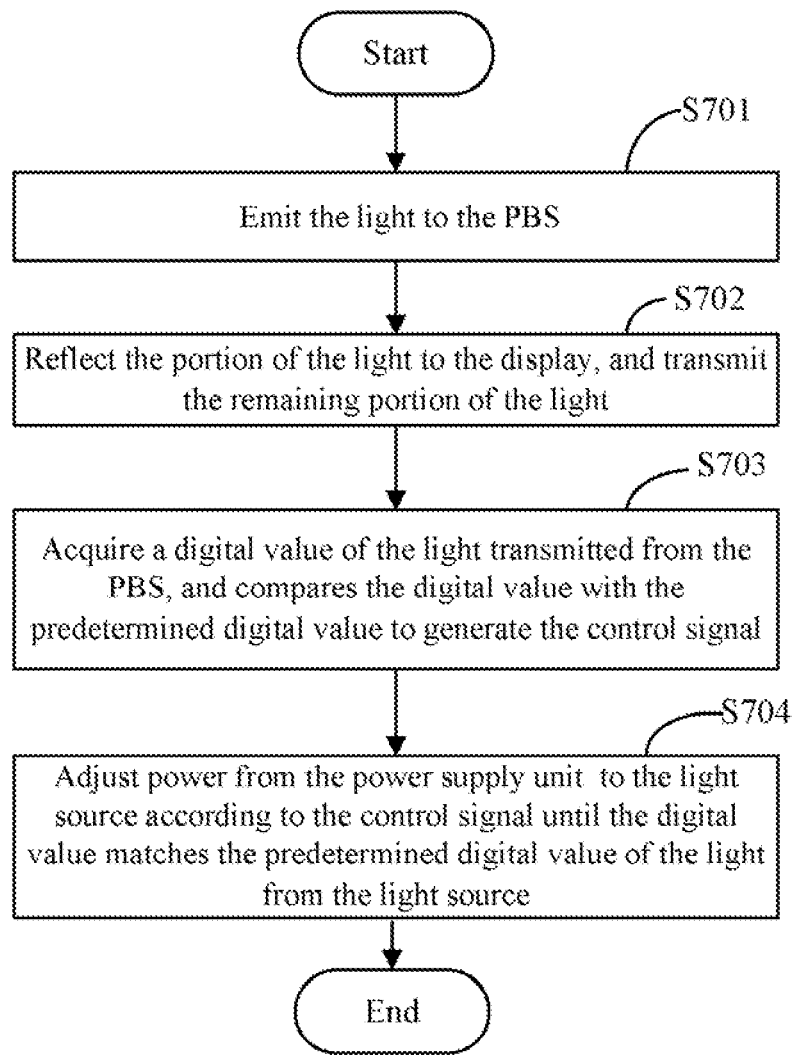
FIG. 4 is a flowchart of a method having a brightness adjustment function implemented by the projection device of FIG. 1, in accordance with an exemplary embodiment.

FIG. 4 is a flowchart of a method having a brightness adjustment function implemented by the projection device of FIG. 1, in accordance with an exemplary embodiment.

In step S701, the light source 10 emits the light to the PBS 33.

In step S702, the PBS 33 reflects the portion of the light to the display 31, and transmits the remaining portion of the light.

In step S703, the light detection unit 101 acquires a digital value of the light transmitted from the PBS 33, and compares the digital value with the predetermined digital value to generate the control signal.

In step S704, the power controller 90 adjusts power from the power supply unit 20 to the light source 10 according to the control signal until the digital value matches the predetermined digital value of the light from the light source 10.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A projection device with a brightness adjustment function comprising:
   a polarization beam splitter (PBS);
   a display;
   a light source for emitting light to the PBS;
   the PBS for reflecting a portion of the light to the display, and transmitting a remaining portion of the light;
   a lens module for projecting the images to be displayed by the display;
   a power supply unit for supplying power for the light source;
   a light detection unit for acquiring a digital value of the light transmitted from the PBS, and comparing the digital value with a predetermined digital value to generate a control signal; and
   a power controller for adjusting power from the power supply unit to the light source according to the control signal until the digital value matches the predetermined digital value of the light from the light source.

2. The projection device as described in claim 1, further comprising a color wheel rotatably placed between the light source and the PBS, wherein the color wheel comprises a plurality of filters which are used for projecting the multicolor lights to the PBS when the light from the light source passes through the color wheel.

3. The projection device as described in claim 1, wherein the light source is an LED.

4. A projection device with a brightness adjustment function comprising:
   three polarization beam splitters (3-PBS);
   three displays for displaying the same images;
   three light source mechanisms for respectively emitting light to the 3-PBS;
   the 3-PBS for respectively reflecting a portion of the light to the three displays, and transmitting a remaining portion of the light;
   a light integrating element for integrating the images from the three displays;
   a lens module for projecting the integrated images;
   a power supply unit for supplying power for the three light source mechanisms;
   a light detection unit for respectively acquiring three digital values of the light transmitted from the 3-PBS, and comparing the three digital values with a predetermined digital value to generate three control signals; and
   a power controller for adjusting power from the power supply unit to the three light source mechanisms according to the three control signals until the three digital values respectively match the predetermined digital value of the light from the three light source mechanisms.

5. The projection device as described in claim 4, wherein the three light source mechanisms are red light, green light and blue light source mechanism, the red light source mechanism comprises a light source and a red filter, the green light source mechanism comprises a light source and a green filter, and the blue light source mechanism comprises a light source and a blue filter.

6. The projection device as described in claim 5, wherein the red light source mechanism is a red light source, the green light source mechanism is a green light source, and the blue light source mechanism is a blue light source.

7. A method with an illumination adjustment function implemented by a projection device; wherein the projection device comprises a light source, a polarization beam splitter (PBS), and a power supply unit, the method comprising:
   emitting light to the PBS;
   acquiring a digital value of the light transmitted from the PBS, and comparing the digital value with a predetermined digital value to generate a control signal; and
   adjusting power from the power supply unit to the light source according the control signal until the digital value matches the predetermined digital value of the light from the light source.

* * * * *